United States Patent
Zhou et al.

(10) Patent No.: US 12,448,726 B2
(45) Date of Patent: Oct. 21, 2025

(54) LAUNDRY DRYER CONTROL SYSTEM

(71) Applicant: Electrolux Home Products, Inc., Charlotte, NC (US)

(72) Inventors: Ran Zhou, Charlotte, NC (US); Brandon King, Charlotte, NC (US); John Scherr, Morresville, NC (US); Pavan Honnegowda, Charlotte, NC (US); Ian Beloved Chazarae Banks, Charlotte, NC (US); Eduardo Palmeira, Charlotte, NC (US)

(73) Assignee: Electrolux Consumer Products, Inc., Charlotte, NC (US)

( * ) Notice: Subject to any disclaimer, the term of this patent is extended or adjusted under 35 U.S.C. 154(b) by 722 days.

(21) Appl. No.: 17/590,336

(22) Filed: Feb. 1, 2022

(65) Prior Publication Data
US 2022/0243387 A1   Aug. 4, 2022

Related U.S. Application Data

(60) Provisional application No. 63/144,101, filed on Feb. 1, 2021.

(51) Int. Cl.
*D06F 58/38* (2020.01)
*D06F 101/20* (2020.01)
(Continued)

(52) U.S. Cl.
CPC .......... *D06F 58/38* (2020.02); *D06F 2101/20* (2020.02); *D06F 2105/56* (2020.02); *D06F 2105/62* (2020.02)

(58) Field of Classification Search
None
See application file for complete search history.

(56) References Cited

U.S. PATENT DOCUMENTS

| | | |
|---|---|---|
| 2,814,886 A | 12/1957 | Fowler |
| 3,398,462 A | 8/1968 | Harter |

(Continued)

FOREIGN PATENT DOCUMENTS

| | | |
|---|---|---|
| AU | 2011244860 A1 | 5/2012 |
| CN | 203776341 U | 8/2014 |

(Continued)

OTHER PUBLICATIONS

"Cycles, settings, and features on your Samsung dryer", downloaded from the internet Apr. 26, 2022, https://www.samsung.com/US/support/answer/ANS00051022/, 2 pages.

(Continued)

*Primary Examiner* — David J Laux
(74) *Attorney, Agent, or Firm* — Bradley Arant Boult Cummings LLP (57) ABSTRACT

A laundry dryer control method comprising: setting the dryer to a default drying operation; performing the default drying operation when a user selects the default setting and does not select a dry boost setting; and performing a non-default drying operation when a user selects the default setting and does select a dry boost setting. In default operation, the dryer operates the drum and fan, and operates supplemental drying mechanism according to a predetermined schedule of "on" cycles and "off" cycles. If dry boost is selected, or if another non-default cycle is selected, the dryer operates the drum, fan and supplemental drying mechanism using a temperature feedback control loop, and operates until the laundry reaches a first dryness threshold.

23 Claims, 2 Drawing Sheets

(51) Int. Cl.
*D06F 105/56* (2020.01)
*D06F 105/62* (2020.01)

(56) References Cited

U.S. PATENT DOCUMENTS

| | | | |
|---|---|---|---|
| 3,475,830 A | 11/1969 | Sutton et al. | |
| 3,499,230 A | 3/1970 | Slugantz | |
| 3,548,157 A | 12/1970 | Lauck | |
| 3,643,346 A | 2/1972 | Lester | |
| 3,758,959 A | 9/1973 | Karklys | |
| 3,783,529 A * | 1/1974 | Miller | D06F 34/08 |
| | | | 34/527 |
| 3,854,219 A | 12/1974 | Staats | |
| 3,864,844 A | 2/1975 | Heidtmann | |
| 3,920,955 A | 11/1975 | Nakata | |
| 4,112,589 A | 9/1978 | Palfrey et al. | |
| 4,196,343 A | 4/1980 | Han | |
| 4,209,915 A | 7/1980 | Keuleman et al. | |
| 4,286,391 A | 9/1981 | Gerry | |
| 4,397,101 A | 8/1983 | Rickard | |
| 4,424,437 A | 1/1984 | Walter et al. | |
| 4,520,259 A | 5/1985 | Schoenberger | |
| 4,640,022 A | 2/1987 | Suzuki et al. | |
| 4,711,988 A | 12/1987 | Thaler et al. | |
| 4,735,219 A | 4/1988 | Seeland | |
| 4,763,425 A * | 8/1988 | Grennan | D06F 58/38 |
| | | | 34/552 |
| 4,842,192 A | 6/1989 | Range et al. | |
| 4,859,926 A | 8/1989 | Wolze | |
| 4,896,021 A | 1/1990 | Poweleit et al. | |
| 4,914,833 A | 4/1990 | Pilolla et al. | |
| 5,147,715 A | 9/1992 | Thurman | |
| 5,163,234 A | 11/1992 | Tsukamoto et al. | |
| 5,187,879 A | 2/1993 | Holst | |
| 5,245,764 A | 9/1993 | Sung | |
| 5,281,956 A * | 1/1994 | Bashark | H02P 25/04 |
| | | | 340/660 |
| 5,425,959 A | 6/1995 | Manser | |
| 5,434,946 A | 7/1995 | Barzilai et al. | |
| 5,651,193 A | 7/1997 | Rhodes et al. | |
| 5,734,289 A | 3/1998 | Khudoshin | |
| 5,768,731 A | 6/1998 | Do | |
| 5,943,470 A | 8/1999 | Lulofs | |
| 5,994,883 A | 11/1999 | Liu | |
| 6,047,486 A * | 4/2000 | Reck | D06F 58/38 |
| | | | 34/550 |
| 6,370,798 B1 | 4/2002 | Gonzalez | |
| 6,404,171 B2 | 6/2002 | Saida | |
| 6,553,595 B1 | 4/2003 | Bruntz et al. | |
| 6,732,449 B2 | 5/2004 | Evanyk | |
| 6,775,924 B2 | 8/2004 | Bruntz et al. | |
| 6,812,437 B2 | 11/2004 | Levy et al. | |
| 6,907,680 B2 | 6/2005 | Mariotti | |
| 6,941,680 B1 | 9/2005 | Zielewicz et al. | |
| 6,995,965 B2 | 2/2006 | Hameed et al. | |
| 7,020,985 B2 | 4/2006 | Casey et al. | |
| 7,148,454 B2 | 12/2006 | Chodacki et al. | |
| 7,310,893 B2 | 12/2007 | Woerdehoff et al. | |
| 8,093,536 B2 | 1/2012 | Kim | |
| 8,274,253 B2 | 9/2012 | Zhao | |
| 8,390,239 B2 | 3/2013 | Zhao | |
| 8,528,227 B2 | 9/2013 | Beers et al. | |
| 8,872,074 B2 | 10/2014 | Recio et al. | |
| 9,238,887 B2 | 1/2016 | Prajescu et al. | |
| 9,359,714 B2 | 6/2016 | Contarini et al. | |
| 9,372,031 B2 | 6/2016 | Contarini et al. | |
| 9,416,476 B2 | 8/2016 | Wong | |
| 9,417,009 B2 | 8/2016 | Heo et al. | |
| 9,435,069 B2 | 9/2016 | Contarini et al. | |
| 9,487,910 B2 | 11/2016 | Huang et al. | |
| 9,534,329 B2 | 1/2017 | Contarini et al. | |
| 9,684,358 B2 | 6/2017 | Kim et al. | |
| 9,982,942 B2 | 5/2018 | Fisher | |
| 10,081,902 B2 | 9/2018 | Jung et al. | |
| 10,100,460 B2 | 10/2018 | Bisaro et al. | |
| 10,351,989 B2 | 7/2019 | Bison et al. | |
| 10,415,177 B2 | 9/2019 | Xu et al. | |
| 10,494,757 B2 | 12/2019 | Xu et al. | |
| 10,501,882 B2 | 12/2019 | Driussi et al. | |
| 12,098,496 B2 * | 9/2024 | McGrane | D06F 58/30 |
| 2004/0055176 A1 | 3/2004 | Yang et al. | |
| 2006/0137105 A1 | 6/2006 | Hong et al. | |
| 2006/0254082 A1 | 11/2006 | Kim et al. | |
| 2008/0116753 A1 | 5/2008 | Carlucci | |
| 2009/0071032 A1 | 3/2009 | Kreutzfeldt et al. | |
| 2009/0133283 A1 | 5/2009 | Ricklefs et al. | |
| 2009/0260256 A1 | 10/2009 | Beaulac | |
| 2011/0062145 A1 | 3/2011 | Yang et al. | |
| 2012/0192596 A1 | 8/2012 | Hall | |
| 2012/0246961 A1 | 10/2012 | Atkins | |
| 2013/0000141 A1 * | 1/2013 | Ghosh | D06F 58/36 |
| | | | 34/524 |
| 2014/0109436 A1 | 4/2014 | Noh et al. | |
| 2014/0345155 A1 * | 11/2014 | Contarini | F26B 21/086 |
| | | | 34/77 |
| 2015/0082658 A1 * | 3/2015 | Contarini | D06F 58/206 |
| | | | 34/524 |
| 2016/0138208 A1 * | 5/2016 | Bison | D06F 58/20 |
| | | | 34/131 |
| 2018/0038037 A1 | 2/2018 | Hui | |
| 2018/0266044 A1 | 9/2018 | Durham | |
| 2018/0298548 A1 | 10/2018 | Kim et al. | |
| 2019/0075905 A1 | 3/2019 | Kennedy et al. | |
| 2019/0119846 A1 | 4/2019 | Jung et al. | |
| 2019/0153659 A1 * | 5/2019 | Prajescu | D06F 58/30 |
| 2019/0244311 A1 | 8/2019 | Ahn et al. | |
| 2020/0208335 A1 | 7/2020 | Chudnovsky et al. | |

FOREIGN PATENT DOCUMENTS

| | | |
|---|---|---|
| CN | 208941152 U | 6/2019 |
| CN | 110735282 A | 1/2020 |
| DE | 102008007564 A1 | 8/2009 |
| DE | 102016220284 A1 | 4/2017 |
| DE | 102016008964 A1 | 1/2018 |
| EP | 0326048 A2 | 8/1989 |
| EP | 1076128 A2 | 2/2001 |
| EP | 2415927 A2 | 2/2012 |
| EP | 3091117 A1 | 11/2016 |
| EP | 3091118 A1 | 11/2016 |
| EP | 3091119 A1 | 11/2016 |
| EP | 3091120 A1 | 11/2016 |
| EP | 2394730 B1 | 8/2017 |
| EP | 3239388 A1 | 11/2017 |
| GB | 2122381 A | 1/1984 |
| GB | 2433886 B | 10/2010 |
| IN | 105212815 A | 1/2016 |
| JP | 2013070833 A | 4/2013 |
| WO | 2009016173 A1 | 2/2009 |
| WO | 2015003742 A1 | 1/2015 |
| WO | 2016206723 A1 | 12/2016 |
| WO | 2018130396 A1 | 7/2018 |

OTHER PUBLICATIONS

"Using the EcoBoost Cycle, What is the EcoBoost option on my Whirlpool dryer?", downloaded from the internet Apr. 26, 2022, https://producthelp.whirlpool.com/Laundry/Dryers/Product_Information/Dryer_Product_Assistance/Using_the_EcoBoost_Cycle, 1 page.
Whirlpool Daily Reference Guide, Product Description, https://www.whirlpool.com, 8 pages.

* cited by examiner

LAUNDRY DRYER CONTROL SYSTEM

This application claims priority to U.S. Provisional Application No. 63/144,101, filed Feb. 1, 2021, which is incorporated herein by reference.

TECHNICAL FIELD

The present disclosure is directed to laundry machine controls, and particularly to heating controls for laundry dryers.

BACKGROUND

Modern laundry drying machines ("dryers") typically operate by rotating the laundry and directing a flow of air over the rotating laundry to remove moisture by evaporation. Although drying can be performed simply using a flow of untreated ambient air, most dryers have a supplemental drying mechanism, such as an electric heating element, a gas heating element, and/or a heat pump dehumidifier, to accelerate evaporation. Such dryers may be provided as a standalone unit, in combination with an attached laundry washing machine, as a combination washer/dryer machine having a single drum to perform both washing and drying, and so on. The terms "laundry drying machine," "dryer" and the like encompass all such configurations.

Supplemental drying mechanisms require additional power, in the form of electricity or gas, to operate. Consuming gas or electricity adds to the operating cost, and creates environmental pollution or byproducts either at the dryer or along the power supply path to the dryer. Nevertheless, consumers desire to use supplemental drying mechanisms to accelerate the drying process, as may be necessary to process the laundry load within a given time frame.

Recently, there has been a push to minimize the use of supplemental drying mechanisms. For example, the United States Environmental Protection Agency ("EPA") has created regulations defining the circumstances under which an appliance will receive the EPA's "Energy Star" or "E-Star" rating, which is a rating indicating a relatively low energy consumption profile of a machine. Improved energy conservation is desirable to consumers and retailers, and qualifying for the E-Star rating or other commercial guidelines indicating such energy saving is considered particularly desirable by many consumers and retailers.

The most recent E-Star regulations require dryers to default to a relatively low-energy operating cycle. This may be implemented simply by programming the dryer to have a default low-energy setting. For example, U.S. Pat. No. 9,359,714 describes programming a dryer to have a default "Eco Dry" cycle, in which the supplemental drying system is operated at a relatively low power consumption level. If a user desires to accelerate the drying process, a relatively high-energy setting may be selected before beginning operation. Similarly, U.S. Pat. No. 10,351,989 describes a dryer that is programmed to allow the user to vary the operation while the selected drying cycle is being performed, to accelerate the drying process. The foregoing references are incorporated herein by reference in their entireties.

While it is known to program a dryer to operate at a default low-energy setting, and provide the option to select a higher-energy setting, the particular programming used to implement these features does not necessarily provide an ideal user experience or ideal energy consumption characteristics. In particular, there are many variables that can be adjusted to implement dryer cycle controls, leading to virtually limitless variations on the final programming and process operating parameters. Furthermore, the control of such a machine—and the results obtained by modifying the operating settings—may not be intuitive to the user. Thus, the inventors have determined that the state of the art can still be advanced.

This description of the background is provided to assist with an understanding of the following explanations of exemplary embodiments, and is not an admission that any or all of this background information is necessarily prior art.

SUMMARY

In a first exemplary aspect, there is provided a method for controlling a laundry dryer comprising a user interface, a rotatable drum, a fan and a supplemental drying mechanism. The method includes setting the dryer to operate using a default drying operation, performing a default drying operation, and performing a non-default drying operation. The default drying operation comprises: receiving a positive selection of the default drying cycle at the user interface, receiving a negative selection of a dry boost function at the user interface, performing the default drying cycle by operating the drum and the fan, and operating the supplemental drying mechanism according to a predetermined schedule of on cycles and off cycles, and terminating the default drying operation after the predetermined schedule is complete. The non-default drying operation comprises: receiving a positive selection of the default drying cycle at the user interface, receiving a positive selection of the dry boost function at the user interface, performing a first non-default operating cycle by operating the drum, the fan and the supplemental drying mechanism, wherein the supplemental drying mechanism is cycled between an activated state when an air temperature measurement in the dryer is below a first predetermined temperature threshold, and a deactivated state when the air temperature measurement in the dryer is above the first predetermined temperature threshold, and terminating the first non-default drying operation when a respective dryness measurement of the drum contents reaches a first predetermined dryness threshold.

In another exemplary aspect, there is provided a laundry drying machine having: a housing; a drum rotatably mounted in the housing; a fan configured to direct a working air flow through the drum; a supplemental drying mechanism; a user interface; and an electronic control unit comprising a processor and a non-transitory memory storing instructions that, when executed by the processor, cause the electronic control unit to perform a method such as described in the first exemplary aspect.

BRIEF DESCRIPTION OF THE DRAWINGS

Embodiments of the inventions disclosed herein will now be described, strictly by way of examples, with reference to the accompanying drawings, in which.

DESCRIPTION OF EXEMPLARY EMBODIMENTS

The present disclosure provides methods to operate dryers to provide improved drying operation while operating in a default low-energy cycle, as well as improved and more intuitive drying operation upon selecting an option to increase drying performance starting from either a default low-energy cycle or a non-low-energy cycle. Embodiments described herein may be used separately, or in any combination, and this disclosure is intended to incorporate all useful variations within its scope.

Figure 1:
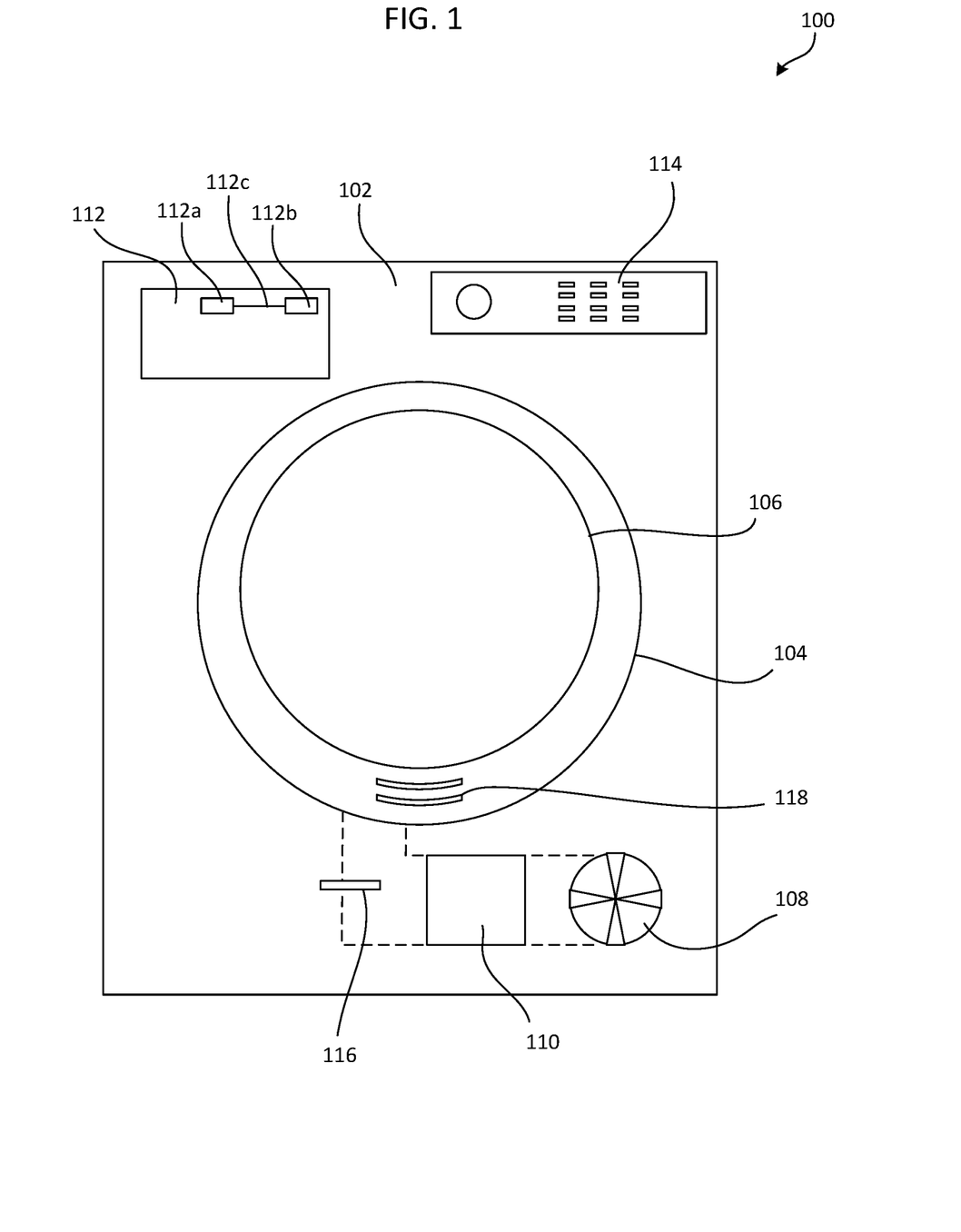
FIG. 1 is a schematic illustration of an exemplary laundry drying machine.

FIG. 1 illustrates an exemplary laundry dryer 100. The dryer 100 generally includes a housing 102, a rotatable drum 104, a door 106 selectively closing the drum 104, a fan 108, a supplemental drying mechanism ("SDM") 110, an electronic control unit ("ECU") 112, and a user interface 114. The user interface 114 may be located entirely on the dryer 100, or it may include remote components, such an interactive software application provided on a portable wireless device having controls that supplement or mirror controls found on the portion of the user interface 114 provided directly on the dryer 100.

The drum 104 and fan 108 may be any suitable motor or motors (not shown), as known in the art. The SDM 110 may comprise one or more electric heating elements (resistive heating elements, positive temperature coefficient heaters, Peltier devices, etc.), gas burners, heat pumps (using generated heat and/or condensation to remove moisture), or the like. Different kinds of SDMs 110 may be used in some cases (e.g., an electric heating element in combination with a gas burner or heat pump, two electric heating elements having different power output ratings, etc.). The fan 108 is connected to the drum 104 via one or more airflow paths (e.g., path leading from the drum 104 to the fan 108 or to ambient air, and a path leading from the fan 108 to the drum 104), and such airflow paths may have features such as filters or the like, as known in the art. One or more ambient air inlets and process air outlets (not shown) may be provided as necessary to introduce new air and evacuate process air, as known in the art.

The control unit 112 is operatively connected to the drum 104 via a drum motor, the fan 108 via a fan motor, the SDM 110, and the user interface 114. The control unit 112 may comprise any suitable assembly of logic and switching circuits, and such circuits may be implemented on one or more printed circuit boards or the like. For example, the control unit 112 may have a central processing unit ("CPU") 112a, a memory 112b (e.g., a flash drive or a read-only memory unit) storing operating instructions in a non-transient format, and a data transfer bus 112c operatively connecting the CPU 112a and memory 112b. Further electrical connections are provided to the drum and fan motors and the user interface 114 to provide a communications and control network within the dryer 100. In addition, if the user interface 114 is mirrored or extended to a wireless device, the control unit 112 may include a wireless transmitting and receiving antenna to communicate with such wireless device. The control unit 112 also may be connected to one or more sensors, such as one or more temperature sensors 116 located in the drum 104 or in the process air flow path, and one or more dryness sensors 118 located in the drum 104, to determine a current operating conditions within the dryer 100. The temperature sensors 116 may comprise thermocouples or the like, as known in the art. The dryness sensors 118 may comprise resistance sensors, capacitive sensors, or the like, as known in the art.

The particular details of the dryer construction can vary, and such details and modifications thereof are generally known in the art and need not be described in greater detail herein.

Figure 2:
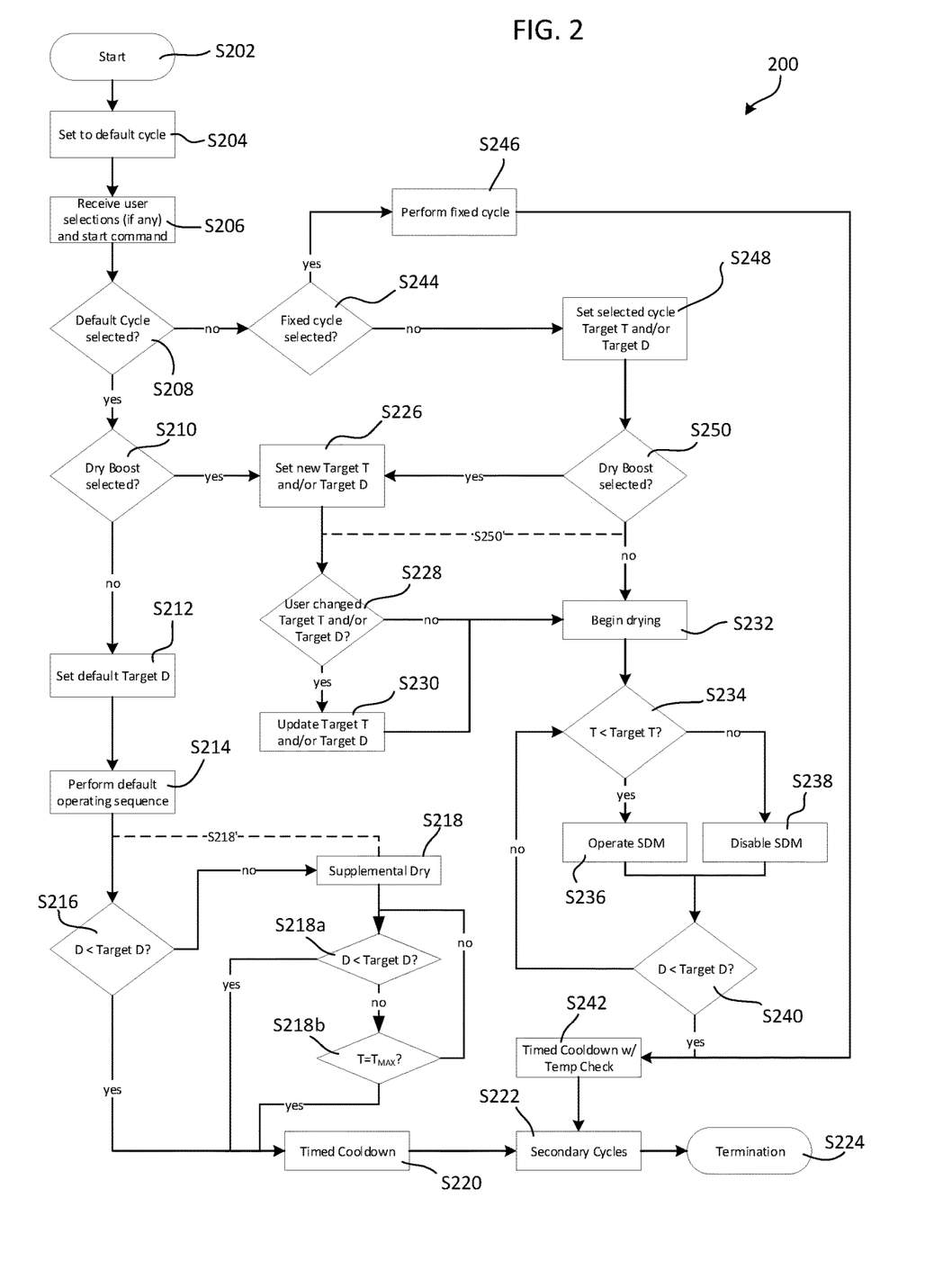
FIG. 2 is a schematic illustration of an exemplary control process for operating a laundry drying machine.

FIG. 2 illustrates an exemplary control process 200, which may be embodied in computer-readable operating instructions that are stored in and executed by the control unit 112. The process starts at step S202, at which time the dryer 100 is activated or placed in a ready state to perform a new drying operation. Such activation may be during an initial power up after being connected to electrical power, after being awoken from a sleep state, or immediately after completion of a prior drying operation. In step S204, the control unit 112 sets the dryer to a default low-energy operating cycle ("Default Cycle"). The Default Cycle may be any operating cycle configured to provide a relatively low energy consumption rate, as certified to satisfy certain rules or guidance as may be set by a government authority or industry standard (e.g., E-Star certification). Step S204 may be performed after the completion of every drying operation, such that the dryer 100 always begins in a Default Cycle, but the user may optionally disable this function, or Step S204 may only be used under certain circumstances.

The dryer 100 may have a single Default Cycle, or it may have multiple different Default Cycles. For example, the dryer 100 may have Default Cycles specific to different clothing types (synthetics, wool, cotton, etc.), load sizes, and so on. In each case, the Default Cycle preferably is configured to provide a relatively low energy consumption rate. If there are multiple different Default Cycles, the control unit 112 optionally may, on startup of the dryer or after a prior cycle is completed, select the last-used Default Cycle based on stored usage data. Upon setting the dryer 100 to a Default Cycle, the control unit 112 displays that cycle as the currently-selected cycle on the user interface 114. For example, a light next to the selected Default Cycle label may be illuminated.

The Default Cycle or cycles may be identified on the user interface 114 as being energy-saving cycles. For example, the Default Cycles may be identified by a particular color or by illuminating a light upon selection of a Default Cycle to indicate it as such. It is also possible for a Default Cycle to not be identified. For example, the dryer 100 may have a single default operating cycle that is a Default Cycle, without displaying it as such to the user.

At step S206, the control unit 112 receives the user's selection of an operating cycle. At this point, the user also might have the option to modify some or all of the operating parameters of the selected operating cycle, by selecting additional inputs at the user interface 114. For example, the user interface 114 may have a rotatable dial to select a cycle specific to a fabric type, and buttons to modify the drying duration, heat level, or desired final dryness level. The user interface 114 also may have inputs to select a timed drying sequence, or other operating cycles. If the Default Cycle is selected (e.g., by not selecting a different operating cycle after the machine is turned on or awakened from a sleep state), it may still be possible to modify the Default Cycle such that it no longer operates in its default state, and is no longer an energy-saving cycle (at least as compared to the default state). For example, the user interface 114 may include an input that can be selected to increase the power output of the operating cycle, which is referred to herein as a "Dry Boost" selection. If the Dry Boost option is selected, a display on the user interface 114 may be altered to indicate that the dryer 100 is no longer operating in a manner that qualifies as a low energy consumption Default Cycle. For example, a light on the user interface 114 that indicates Default Cycle operation may be turned off.

A Dry Boost selection input may be desirable when a user's past experience with a particular operating cycle suggests that the operating cycle will not achieve the desired final dryness level of the laundry load. Any number of factors can lead to this. For example, the user's particular laundry washing machine may leave a relatively large volume of water in the laundry, the environment may be particularly humid, or the laundry may comprise fabrics or articles that are relatively difficult to dry.

A Dry Boost selection may be available for any number of operating cycles, including both Default Cycles and non-Default Cycles. The Dry Boost selection also may be unavailable for certain operating cycles, such as an air dry cycle (which might be identified as one of multiple different Default Cycles), or a manual dry cycle in which the user manually sets one or more of the operating parameters (time, heat, dryness level, etc.).

Step S206 may end when the user activates a start input or otherwise begins the dryer's operation (e.g., starting after a time delay).

In step S208, the control unit 112 identifies the cycle selected at the user interface 114 by the user. The user can select the Default Cycle simply by starting dryer operation (e.g., pressing a start button without any other input). The user also might select the Default Cycle using the user interface 114 if another cycle was previously selected, such as might happen if the user scrolls through different cycles but returns to the Default Cycle. Also, if multiple different Default Cycles are available, the user might select one of the groups of available Default Cycles. In any case, upon determining that the user has opted to start the dryer using the Default Cycle (either by affirmatively selecting it or simply proceeding without changing away from it), the control unit 112 considers this a positive selection of the Default Cycle process and continues to step S210.

In step S210, the control unit 112 determines whether the user has selected the Dry Boost option (i.e., the control unit 112 has registered a positive selection of the dry boost function). The Dry Boost option may be selected by selecting a specific cycle modifier on the user interface 114, such as a button or input key that states "Dry Boost" or something else that indicates an enhanced drying operation. The Dry Boost option also may be selected by proceeding with the Default Cycle setting, but modifying the desired dryness or operating temperature. If the Dry Boost option is not selected (i.e., the control unit 112 has registered a negative selection of the dry boost function), the process continues to step S212.

In step S212, the control unit 112 queries its memory to identify the default operating parameters for the Default Cycle. If multiple Default Cycles are available, each cycle may have a unique set of operating parameters. Step S212 also may include a process for evaluating the state of the laundry, and selecting default operating parameters based on the laundry condition. For example, the control unit 112 may query a dryness sensor 118 to determine a starting moisture level, rotate the drum to determine load size or weight, and so on. Based on such information, the control unit 112 may select or calculate different default operating parameters (e.g., increase SDM activation time(s) if the load is larger or has more moisture, and vice-versa). Any such automatic changes to the Default Cycle may be limited to prevent the cycle from exceeding a desired maximum energy use limit.

The Default Cycle or cycles may have any suitable set of operating parameters to operate the dryer 100 in a relatively low-energy state. In the illustrated embodiment, the cycle-specific default operating parameters include a default operating sequence, such as a specific sequence of operations that are performed in step S214 as discussed below. One or more of the cycle-specific default operating parameters also may include supplemental or conditional operating instructions, such as a supplemental drying process, or a timed cooldown, such as described below.

In step S214, the control unit 112 begins operating the dryer 100 to perform the default operating sequence. For instance, the default operating sequence may comprise a sequence of timed steps, such as activating and deactivating the SDM 110 according to a predetermined schedule or "on" and "off" cycles. Each "on" and "off" cycle preferably comprises a period of at least 10 seconds, more preferably at least 20 seconds, and even more preferably at least 30 seconds to prevent excess heater cycling. In one preferred embodiment, in which the SDM 110 is an electric heating element, the default operating sequence comprises activating the SDM 110 according to the schedule in Table 1, in which all times are provided as approximate values.

TABLE 1

| Step | Duration | SDM status |
|---|---|---|
| 1 | 90 seconds | On |
| 2 | 11 minutes, 30 seconds | Off |
| 3 | 2 minutes | On |
| 4 | 11 minutes, 30 seconds | Off |
| 5 | 2 minutes | On |
| 6 | 11 minutes, 30 seconds | Off |
| 7 | 16 minutes, 10 seconds | On |

In another preferred embodiment, in which the SDM 110 is a gas heating element, the default operating sequence in step S214 comprises activating the SDM 110 according to the schedule in Table 2, in which all times are provided as approximate values.

TABLE 2

| Step | Duration | SDM status |
|---|---|---|
| 1 | 90 seconds | On |
| 2 | 19 minutes | Off |
| 3 | 3 minutes, 14 seconds | On |
| 4 | 10 minutes | Off |
| 5 | 15 minutes, 20 seconds | On |

One or more of the steps may be modified, or an entirely different sequence of steps may be selected during step S212 to account for load size, moisture content, or the like. For example, additional time may be added to one or more of the SDM "on" cycles to account for a larger load. As another example, times may be modified to account for operating lag in the SDM 110, such as time delays for firing a gas burner, time delays to raise the temperature of an electric heating element, or time delays for raises a heat pump system to the desired operating parameters. Times also may be modified to account for different types of gas used in a burner, ambient temperature, altitude, and other factors.

The drum and fan motors may be operated continuously or intermittently, and at various speeds or directions, throughout the default operating sequence. Preferably, the drum and fan motors are operated at a uniform rate throughout the process.

In the foregoing example, the steps are defined by heater operation times. This operation can be performed without feedback from status sensors, such as temperature sensors 116 or moisture sensors 118. However, the default operating sequence also may include feedback controls, such as dynamic alterations, within fixed parameters, to adjust for operating conditions. As one example, one or more of the SDM "on" cycles may be performed with process air temperature feedback control to prevent the process air from exceeding a predetermined value. For example, one or all of the "on" cycles may be temporarily interrupted by deactivating the SDM 110 if a temperature measurement in the process air exceeds an upper threshold, and then reactivating the SDM 110 if and when the temperature measurement drops below a lower threshold. This ensures operating safety while still continuing with drying. In this case, the "on" cycle is conditional, meaning that the SDM 110 defaults to an activated state, but is not necessarily active throughout the entire "on" cycle time period. Conversely, the "off" cycles may be absolute, meaning that the SDM 110 will not be activated under any conditions during the "off" cycle.

One or more of the SDM "on" cycles may be lengthened by up to a predetermined amount if the temperature sensor 116 or dryness sensor 118 indicates values that are below respective thresholds at particular times. Such modifications preferably are performed within constraints to ensure that the overall process does not exceed energy consumption values required to maintain any applicable certification or rating. It will also be appreciated that one or more of the SDM "on" cycles may be modified by including additional parameters, such as adding time to account for variations in the operating performance of the SDM 110, or requiring one or more of the SDM "on" cycles (e.g., Step 1 in Tables 1 and 2 above) to continue until a predetermined minimum air temperature is reached, at which point temperature feedback may be terminated. Other alternatives and variations will be apparent to persons of ordinary skill in the art in view of the present disclosure.

The default operating sequence S214 preferably is performed until all of the "on" cycles and "off" cycles are complete (i.e., until the end of the last "on" cycle). The process 200 may then proceed to a termination process S224 (optionally via a cooldown process S220 and secondary cycles S222) after step S214 is complete. However, in the illustrated example, the process 200 may include a supplemental drying process S216-S218. The supplemental drying process begins at step S216, at which time the control unit 112 queries a dryness sensor 118 to determine whether the laundry has satisfied a predetermined default target dryness level ("Target D"). The default target dryness level may be established in step S212 as a cycle-specific default value for the selected Default Cycle. The target dryness level also may be based on a separate user input (e.g. requesting more or less drying or indicating particular fabric types), feedback from a load size determination process, and so on.

If it is determined in step S216 that the laundry has achieved the target dryness level, the process 200 proceeds to a termination process S224, which may be preceded by a cooldown process S220 and/or secondary cycles S222, as noted above.

If it is determined in step S216 that the laundry has not achieved the target dryness level, the control unit 112 performs supplemental drying in step S218. The supplemental drying step S218 may include one or more predetermined operating functions or steps that are intended to further dry the laundry. For example, the supplemental drying step S218 may be performed by operating the drum and fan motors and activating the SDM 110 for a fixed time period (e.g., two minutes for an electric heater following the process of Table 1, or 44 seconds for a gas heater following the process of Table 2), or according to another predetermined schedule of "on" cycles and "off" cycles," then continuing to operate the drum and fan motors until a predetermined time elapses or the measured dryness level reaches (i.e., meets or exceeds) the target dryness level. As shown in steps S218a and S218b, when the measured dryness reaches the target dryness level, or if the measured dryness does not reach the target dryness level within a fixed time period ($t_{MAX}$), the process proceeds towards termination S224. Thus, in some cases, the supplemental drying step S218 may run to completion in all cases, and in other cases is may be terminated at any time after it begins upon determining that the dryness of the laundry has reached the default target dryness threshold.

Alternatively (or additionally), the supplemental drying process S216-S218 may be repeated one or more times before moving towards termination S224. For example, after 10 minutes operating in step S218 (e.g. two minutes of operating with an electric heater on followed by eight minutes of operating with the heater off), the process 200 may return to step S216, as shown by the dashed process line S218', to again check the dryness of the laundry load. If the dryness has reached the predetermined threshold, the process 200 moves towards termination S224. If not, the process returns to step S218 for additional operation of the SDM 110 (e.g., activating the SDM 110 for an additional two minutes then operating without the SDM 110 for another eight minutes). The control unit 112 may limit the number of times this process can be repeated, and may vary the amount of energy consumed by the SDM 110 activations during each subsequent return to step S218, to thereby prevent the default drying operation from exceeding a desired energy use threshold.

The dryness level also may be continuously monitored during the supplemental drying process, to allow termination immediately upon reaching the target dryness level. Other alternatives and variations will be apparent to persons of ordinary skill in the art in view of the present disclosure.

The total operating time of the supplemental drying process S218 also may be limited to prevent excessively long operation times. For example, the process 200 may automatically move to step S224 for completion, if the total elapsed time from the start at step S214 reaches a predetermined total time value. The total time value may be selected as a default value for all operation cycles, as a cycle-specific value particular to each operating cycle, as a function of a user selection (e.g., increasing the time value if the user selects a higher target dryness level), and so on. Similarly, if the supplemental drying process S218 is performed to completion and then repeated if the dryness has not met the desired level, the number of repetitions may be limited to ensure that the overall process 200 does not exceed particular energy-saving guidelines or certifications, or does not continue for an excessively long time.

The process 200 may include one or more intermediate steps before termination S224. For example, the process 200 may include a timed cooldown process S220 in which the drum and fan are operated with the SDM 110 disabled for a fixed amount of time. This allows the temperature of the laundry to reduce to a level at which it is safe to handle. The timed cooldown S220 preferably has a fixed duration (e.g., two minutes), to thereby consume a predetermined limited quantity of energy, thus helping the overall operation remain within the desired guidelines and preventing excessive operating times.

The process 200 also may include secondary cycles S222, which may be performed before or after the cooldown process S220, and which may be performed by default or manually selected by the user at the beginning (i.e., in step S206 or as a standing order) or during operation of the cycle. One example of a secondary cycle S222 is a timed tumbling cycle, with or without airflow, to help prevent wrinkle formation. As another example, the secondary cycle S222 may include a final heating process, such as operating the SDM 110 (and drum and fan motors) for an additional period of time (e.g., 30 seconds for an electric heater following the process in Table 1, or 14 seconds for a gas heater following the process in Table 2), to warm the laundry somewhat. This may help ensure that the desired level of dryness has been met throughout the load, and also may present the laundry to the user in a more satisfying slightly warmed condition after the process is complete. The final heating process may be performed before, during or after a timed cooldown process S220. The control unit 112 also may, if the load is not immediately removed (as detected, e.g., by a door opening sensor), perform a secondary cycle S222 by periodically operating one or both of the drum motor and the fan motor to help prevent wrinkles from setting in the laundry. Other alternatives and variations will be apparent to persons of ordinary skill in the art in view of the present disclosure.

Finally, in step S224, the process 200 terminates. At this point, no further operations are performed to dry or otherwise treat the laundry. The termination process S224 may include a step of returning the dryer 100 to a default operating cycle, setting a timer to begin a power-down or sleep cycle, and so on.

Referring back to step S210, if the control unit 112 determines that the user has selected a Default Cycle and has also selected a Dry Boost function, and the process proceeds to step S226. In this case, the Default Cycle transitions to a non-default cycle, and the process does not proceed according steps S212 to S214 (and steps S216 and S218, if used).

In step S226, the control unit 112 identifies predetermined alternative operating parameters for the selected Default Cycle. In particular, each Default Cycle preferably has one or more alternative operating parameters, such as a target operating temperature and/or a target dryness value, associated with it. The, alternative operating parameters are used when a user opts to perform the Default Cycle with the Dry Boost option selected. Each Default Cycle may have a unique set of default target temperature and target dryness values (e.g., a first Default Cycle for drying linens might have different target temperature and dryness values than a Default Cycle for drying sweaters or overwear), but other arrangements are possible. In any case, selecting the Dry Boost function modifies one or more variables, and preferably at least one of the target temperature and the target dryness, to accelerate drying or increase the final dryness measurement of the laundry as compared to the Default Cycle.

The dryer 100 also may be configured to allow the user to select additional modifiers other than the Dry Boost option. For example, the user interface 114 might have dryness and temperature level inputs that activated to receive input when the user selects the Dry Boost option. Such inputs may simply be value adjustments (e.g., "extra dry," "low temperature," etc.), or they may have only logical associations with the adjustments (e.g., "delicates," "bulky items," "sweaters," etc.). Other additional operation modifiers might include load size selection, fabric type selection, and so on.

If additional modifiers are permitted and selected, the process proceeds to step S228, in which the control unit 112 determines whether the user has selected any such modifications, and step 230, in which the control unit 112 applies any changes correlating to such modifications. Of course, these determinations and adjustments may be made in step S206 at the time the user enters the start command.

After identifying and applying the default or modified default operating parameters, the control unit 112 proceeds to perform the drying operation.

The drying process begins in step S232, in which the control unit 112 activates the drum and fan motors. The control unit 112 then begins a feedback control process using air temperature measurements (which may be taken at any suitable location in the working air flow path, including the drum) to raise the air temperature to the target operating temperature, and maintain the process air temperature at this value until it is determined that the laundry has reached the desired dryness level. For example, the process 200 may perform a control loop comprising: checking whether the air temperature is less than the target temperature in step S234; alternatively activating (or maintaining activation of) the SDM 110 if the target temperature has not been reached in step S236, or deactivating (or maintaining the deactivation of) the SDM 110 if the target temperature has been reached in step S238; and determining whether the target dryness level has been reached in step S240. If the target dryness level has been reached, the process 200 moves towards the termination process S224. If the target dryness level has not been reached, the process 200 continues the control loop starting at step S234.

As with other embodiments, the drum and fan may continue operating at respective fixed speeds throughout the process identified at steps S234 through S240, or they may be operated intermittently, at varying speeds, periodically in reverse, and so on. It will also be understood that the control loop beginning at step S234 may begin after a delay following step S232, or simultaneously with step S232. The control loop beginning at step S234 also may be performed at any desired frequency (e.g., rechecking temperature and dryness every two seconds).

Also, delays may be deliberately incorporated into the feedback control loop to prevent rapid activation and deactivation of the SDM 110. For example, the target temperature may be a predetermined range of temperatures. In this case, step S234 may proceed to step S238 to disable the SDM 110 only if the temperature exceeds the high end of the predetermined range, and may proceed to step S236 to enable the SDM 110 only if the temperature drops below the low end of the predetermined range. Other alternatives and variations will be apparent to persons of ordinary skill in the art in view of the present disclosure.

The drying process performed upon selecting both a Default Cycle and a Dry Boost option may or may not satisfy rules or guidelines set for identifying a drying cycle as a certified low-energy cycle. If such rules or guidelines are not met, then the control unit 112 preferably indicates at the user interface 114 that the dryer 100 is no longer operating in a certified low-energy cycle. For example, a light next to the selected Default Cycle label may be turned off, or a separate light may be illuminated to indicate that a relatively high-energy mode of operation will be or is being performed. A prompt also may be presented to the user to confirm that operation in a non-low-energy mode is desired.

While the process explained in relation to steps S226 through S240 is preferred in some embodiments, alternative processes may be used in other embodiments. For example, the process in steps S226 through S240 may be replaced by a timed drying process. As another example, the process may be replaced by a process substantially the same as described in relation to steps S214 through S220, but with different SDM "on" and "off" cycle times (e.g., increasing each "on" cycle time by 25%). Other alternatives and variations will be apparent to persons of ordinary skill in the art in view of the present disclosure.

Referring back to step S240, once the target dryness level is reached, as indicated by querying one or more dryness sensors, the process 200 moves to step S242 to perform a cooldown process S242. In this case, the cooldown process is a timed process with temperature verification to ensure that the laundry is at or below a safe temperature. For example, once step S240 returns a positive indication that the target dryness has been reached, the SDM 110 may be deactivated (if not currently deactivated), while the drum and fan continue operating for a predetermined time (e.g., five minutes). At the end of five minutes, the process air temperature may be measured periodically or essentially constantly (i.e., as frequently as the control system 112 hardware permits). When the process air drops below a predetermined temperature, the drum and fan are deactivated and the process moves towards termination S224.

The non-default drying operation in steps S226-S242 also may include one or more secondary cycles S222, such as described previously herein, which may be performed before, of after the cooldown step S242.

Upon completing the cooldown process S242 and any secondary cycles S222, the process terminates in step S224, such as described above.

Referring back to step S208, if the control unit 112 determines that the user has not selected a Default Cycle, the process 200 moves to step S244. In step S244, the control unit 112 determines whether the user has selected a fixed drying cycle. A fixed drying cycle might comprise, for example, a cycle that is operated at a fixed temperature for a predetermined amount of time. One example of a fixed cycle is a timed air-dry cycle in which the drum 104 and fan 108 are operated for a predetermined time without activating the SDM 110. Another example of a fixed cycle might be a cycle that allows the user to set the temperature and time of the cycle, and then operates the drum and fan for that fixed amount of time, and operates the SDM 110 at the desired temperature (e.g., by using temperature feedback control of the SDM 110 as described in steps S234-S238) or according to a predetermined operating schedule such as described in relation to Tables 1 and 2. In any event, a fixed cycle does not include an option for modifying default operating values using a Dry Boost function. Instead, all variables are dictated by direct selection by the user.

In step S246, the control unit 112 operates the dryer 100 to perform the fixed cycle. The fixed cycle may end with a cooldown process such as step S242 or S220, and might include secondary cycles S222. The fixed cycle also might include a dryness end condition by periodically checking the dryness of the drum contents and proceeding to termination S224 (via any cooldown or secondary cycles, if selected) when the dryness measurement reaches a predetermined or user-selected threshold.

Referring back to step S244, if the user has not selected a fixed drying cycle, the process 200 moves to step S248. In step S248, the control unit 112 identifies one or more operating parameters for the selected non-default cycle. Such parameters may include a target process air temperature, a target dryness level, drum and/or fan rotation speed settings, and so on. One or all of these parameters may be cycle specific. For example, a "wool" cycle may have a relatively low target temperature and target dryness level, whereas a "linens" cycle may have a relatively high target temperature and target dryness level.

Next, in step S250, the control unit 112 determines whether the user has selected a Dry Boost option. If Dry Boost has not been selected, the process continues to step S232, and then, in this example, to the feedback-controlled operations in steps S234 to S240. As before, this process might conclude with a cooldown step S242 and may include secondary cycles S222 before leading to termination S224. In other cases, the drying process performed after step S232 may be different from steps S234 to S240. For example, the process may include extra steps (e.g., incorporating a timer to prevent excessive operation time), or omit steps (e.g., omit the dryness determination in step S240), or replace steps (e.g., use a predetermined non-feedback schedule for operating the SDM 110 rather than feedback control as in steps S234 to S238).

As indicated by dashed line S250', the process 200 alternatively may allow the user to modify the selected cycle by making changes other than selecting the Dry Boost option. In this case, the process proceeds along path S250' to steps S228 and 230 to identify and apply any modifications before starting drying in step S232.

If it is determined in step S250 that the user has selected the Dry Boost option, the process moves to step S226, in which the control unit 112 updates one or more of the dryer operating parameters for the selected cycle. The new operating parameters set in step S226 may be cycle specific. For example, a "wool" cycle might have a Dry Boost target temperature that is 5% greater than the target temperature selected in step S248, whereas a "linens" cycle might have a Dry Boost target temperature that is 15% greater than the target temperature selected in step S248. Alternatively, the new operating parameters set in step S226 may be proportional changes that are applied uniformly to multiple different selected cycles. For example, step S226 may comprise increasing the target temperature by 5%, regardless of which cycle is selected. It is expected that any number of non-default cycles may be incorporated into the dryer, and each of these non-default cycles can have its own cycle-specific default temperature and dryness thresholds that are used in steps S234-S240, and each individual cycle also may have a unique set of modified temperature and dryness thresholds that are used in steps S234-S240 when the Dry Boost function is selected.

A variety of different parameters may be modified in step S226. For example, one or more of a target temperature, target dryness value, fan speed, or drum speed might be modified throughout, or during a portion of, the drying process. As another example, a parameter may be modified by adding additional operating sequences. For example, the target temperature identified in step S248 may be maintained as it is, but feedback controls used in steps S234 to S238 to periodically turn off the SDM 110 when the measured temperature exceeds the target temperature might be performed at a relatively low frequency to allow greater heat accumulation between temperature checks. As still another example, a parameter such as the target temperature can be modified to have a non-linear profile, such as starting at a high value, and reducing to a lower value during the course of the cycle. Other alternatives and variations will be apparent to persons of ordinary skill in the art in view of the present disclosure.

After step S226, the process continues to steps S228 and S230 (if additional modifiers are permitted), or directly to step S232, if modifiers in addition to selecting Dry Boost are not permitted. From step S232, the drying operation may be performed as described in steps S234 to S240, or according to other processes. For example, the drying process performed after step S232 may include extra steps (e.g., incorporating a timer to prevent excessive operation time), omit steps (e.g., omit the dryness determination in step S240), or replace steps (e.g., use a predetermined non-feedback schedule for operating the SDM 110 rather than feedback control as in steps S234 to S238). Other alternatives and variations will be apparent to persons of ordinary skill in the art in view of the present disclosure.

The process 200 represented in FIG. 2 is illustrated using a certain logical flow path to facilitate describing the various user inputs and control unit decisions that might be made when establishing and executing the operating parameters for a particular drying operation. These processes are shown as a series of steps to highlight each decision. However, it will be understood that the particular process by which the decisions are made may be modified in various ways. For example, decision steps S208, S210, S228, S244 and S250 may be performed in a single process step upon receiving a start command (immediate start or timed start) from the user. Alternatively, one or more decision steps may be performed dynamically during the course of user input, or after a start command is received. Similarly, the determination and setting of the dryer operating parameters for a given drying operation, such as the settings described in steps S212, S226, S230 and S248, may be performed at any suitable time (e.g., at the times of the decision steps or otherwise), and using any suitable method (e.g., by performing calculations, querying lookup tables, querying a record of user input selections, etc.). Other alternatives and variations will be apparent to persons of ordinary skill in the art in view of the present disclosure.

The foregoing describes various features that may be used together, or in other useful combinations, and it will appreciated that a control unit 112 may be programmed to allow the user to make any number of changes to the processes. For example, a Default Cycle process performing step S216 or S218 might be followed by a timed cooldown with a temperature check such as described in step S242, or a process performing step S240 may be followed by a simple timed countdown as described in step S220. Other alternatives and variations will be apparent to persons of ordinary skill in the art in view of the present disclosure.

It is expected that embodiments can provide various improvements over the state of the art. For example, the Default Mode operating sequence examples above in Tables 1 and 2 are expected to provide good performance at a relatively low power output for certain dryer configurations, but other selections of "on" and "off" cycles may be suitable in some cases. Also, providing a default operating cycle using a predetermined schedule such as this can be useful in combination with a feedback controlled cycles such as the Dry Boost cycle to provide the user with both energy savings and intuitive dryer operation. When operating in default mode, the dryer can adequately dry certain laundry loads by operating for a relatively long time at an energy-conserving pace. However, when faster drying is desired, or if the user is drying what are known to be more difficult articles to dry, the user can select the Dry Boost option to move to a more intense feedback-controlled drying operation that will terminate the drying sequence and move to cooldown, secondary cycles, or termination immediately upon detecting that the desired dryness is reached.

Furthermore, the combination of a predetermined operating sequence such as step S214, followed by a feedback-controlled finishing process if a target dryness is not met (e.g., steps S216 and S218), is expected to provide a reliable way to perform a Default Mode cycle that satisfies certain energy consumption rules and guidelines, and thus provides added energy conservation unless the user specifically opts out of the Default Cycle. Also, the predetermined portion of the drying process (step S214) may be set to consume a known amount of energy that is below the maximum amount to satisfy regulations or guidelines, such that the additional drying process (steps S216 and S218) can be performed one or more times without exceeding the maximum energy use amount. Thus, the maximum energy amount may not be exceeded even for loads that require extra drying. It is also expected that this combination of a fixed process and a feedback-controlled process will generally provide good drying performance within what users would consider to be a reasonable amount of operating time (e.g., 80 minutes). Thus, a more favorable Default Cycle system is provided.

Another benefit that might be achieved by embodiments is that the dryer 100 can be provided with a single Dry Boost input that is functional to modify both Default Cycles and non-Default Cycles in a manner that provides a consistent user experience by following the same general process steps, which might improve user satisfaction and increase the intuitiveness of the dryer operation. The Dry Boost option can also convert the dryer operation process 200 to be consistent with an automatic drying control loop such as the one shown in steps S234 through S240, which provides consistent drying performance and requires less intensive programming and product development requirements.

As indicated above, the dryer 100 may be configured to display the status of a chosen drying cycle with respect to satisfying low-energy usage regulations or guidelines. This can be done simply by illuminating a light to indicate that the selected operating parameters satisfy low-energy requirements. In addition, it is contemplated that the control unit 112 can be programmed to generate more specific energy output information and present it to the user. For example, the control unit 112 may be programmed to indicate a relative power consumption value for each selected operating cycle (e.g., indicating "high," "medium," "low," or "Eco" on the user interface 114), or an estimated actual power consumption value for each selected operating cycle (e.g. power indicated in Watts, Joules or the like). In addition, more detailed and updated information can potentially be provided by downloading relevant power usage data from an internet-based server, and transmitting it to the user's portable electronic device. This process can also be used in cases in which the user downloads an operating cycle from the internet. For example, authorized operating cycles may be provided with data indicating the relative or estimated actual power consumption.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A method for controlling a laundry dryer, the method comprising:

providing the laundry dryer comprising a user interface, a rotatable drum, a fan, a supplemental drying mechanism, and a control unit, wherein the control unit is programmed to identify a plurality of activation parameters including a schedule of on cycles and off cycles and a drum temperature that is less than a drum temperature threshold and programmed to identify a plurality of termination parameters including a time interval having passed and a dryness level measurement of drum contents reaching a dryness measurement threshold;
determining a state of an input;
modifying a selected drying operation from a plurality of drying operations in response to the state of the input;
performing the selected drying operation by:
selecting one of the plurality of activation parameters;
selecting one of the plurality of termination parameters;
operating the drum and the fan;
activating the supplemental drying mechanism in accordance with the selected activation parameter; and
terminating the selected drying operation in accordance with the selected termination parameter.

2. The method of claim 1, wherein:
selecting one of the plurality of activation parameters includes selecting the drum temperature threshold from a plurality of drum temperature thresholds; and
selecting one of the plurality of termination parameters includes selecting the dryness measurement threshold from a plurality of dryness measurement thresholds.

3. The method of claim 1, wherein selecting one of the plurality of activation parameters includes selecting the drum temperature threshold from a plurality of drum temperature thresholds and modifying the selected drum temperature threshold value upon receiving a temperature modification selection at the user interface.

4. The method of claim 1, wherein selecting one of the plurality of termination parameters includes selecting the dryness measurement threshold from a plurality of dryness measurement thresholds and modifying the selected dryness measurement threshold value upon receiving a dryness modification selection at the user interface.

5. The method of claim 1, further comprising:
setting the laundry dryer to operate using a default drying operation upon activating power to the laundry dryer from an off or sleep state.

6. The method of claim 1, further comprising:
setting the laundry dryer to operate using a default drying operation after terminating the selected drying operation.

7. A laundry drying machine comprising:
a rotatable drum;
a fan configured to direct an air flow through the drum;
a supplemental drying mechanism configured to selectively heat the air flow;
a user interface having a first input and a second input; and
an electronic control unit comprising a processor and a non-transitory memory storing instructions that, when executed by the processor, cause the electronic control unit to:
determine a state of the first input and the second input;
perform a default drying operation in response to the first input being in a positive state and the second input being in a negative state by:
operating the drum and the fan;
activating and deactivating the supplemental drying mechanism according to a predetermined schedule of on cycles and off cycles at a first power output level; and
terminating the default drying operation after the predetermined schedule is complete; and
perform a first non-default drying operation in response to the first input being in the positive state and the second input being in a positive state by:
operating the drum and the fan;
measuring a temperature within the drum during operation of the drum and the fan;
activating the supplemental drying mechanism when the temperature within the drum is less than a first temperature threshold at a second power output level, wherein the second power output level is greater than the first power output level;
deactivating the supplemental drying mechanism when the temperature within the drum is greater than the first temperature threshold;
measuring a dryness level of contents of the drum; and
terminating the first non-default drying operation when the dryness level reaches a first dryness threshold.

8. The laundry drying machine of claim 7, wherein the step of terminating the default drying operation further comprises the steps of:
measuring a dryness level of contents of the drum;
initiating a supplemental drying process in response to determining that the dryness level of the contents of the drum is below a default dryness threshold; and
terminating the default drying operation after initiating the supplemental drying process.

9. The laundry drying machine of claim 8, wherein the step of terminating the default drying operation after initiating the supplemental drying process further comprises the steps of:
terminating the default drying operation upon completion of the supplemental drying process;
terminating the default drying operation upon determining that the dryness level of the contents of the drum reaches the default dryness threshold; or
terminating the default drying operation at a predetermined time after beginning the default drying operation.

10. The laundry drying machine of claim 9, wherein the default dryness threshold is less than the first dryness threshold.

11. The laundry drying machine of claim 7, wherein the instructions, when executed by the processor, further cause the electronic control unit to:
determine a first value of the first temperature threshold;
receive a temperature modification selection at the user interface; and
modify the first value of the first temperature threshold to a second value in response to receiving the temperature modification selection, wherein the second value is greater than the first value.

12. The laundry drying machine of claim 7, wherein the instructions, when executed by the processor, further cause the electronic control unit to:
determine a first value of the first dryness threshold;
receive a dryness modification selection at the user interface; and
modify the first value of the first dryness threshold to a second value in response to receiving the dryness modification selection, wherein the second value is greater than the first value.

13. The laundry drying machine of claim 7, wherein the instructions, when executed by the processor, further cause the electronic control unit to perform a timed cooldown operation without temperature feedback.

14. The laundry drying machine of claim 7, wherein the step of activating the supplemental drying mechanism according to a predetermined schedule comprises raising a process air temperature to a maximum value that is less than the first predetermined temperature threshold.

15. The laundry drying machine of claim 7, wherein the step of operating the supplemental drying mechanism according to a predetermined schedule of on cycles and off cycles comprises, during at least one on cycle, deactivating and activating the supplemental drying mechanism in response to process air temperature feedback.

16. The laundry drying machine of claim 7, wherein the supplemental drying mechanism comprises at least one of an electric heating element, a gas heating element, and a heat pump.

17. The laundry drying machine of claim 7, wherein the instructions, when executed by the processor, further cause the electronic control unit to perform a second non-default drying operation in response to the first input being in a negative state and the second input being in the negative state by:
    operating the drum and the fan;
        measuring the temperature within the drum during operation of the drum and the fan;
    activating the supplemental drying mechanism when the temperature within the drum is less than a second temperature threshold;
    deactivating the supplemental drying mechanism when the temperature within the drum is greater than the second temperature threshold;
    measuring a dryness level of contents of the drum; and
    terminating the second non-default drying operation when the dryness level reaches the second predetermined dryness threshold.

18. A laundry drying machine comprising:
    a rotatable drum;
    a fan configured to direct an air flow through the drum;
    a supplemental drying mechanism configured to selectively heat the air flow;
    a user interface having an input; and
    an electronic control unit comprising a processor and a non-transitory memory storing instructions that, when executed by the processor, cause the electronic control unit to:
        determine a state of the input;
        select a selected drying operation from a plurality of drying operations in response to the state of the input, wherein the plurality of drying operations includes a default drying operation configured to produce a first power output and a non-default drying operation configured to produce a second power output, wherein the second power output is greater than the first power output;
        perform the selected drying operation by:
            selecting one of a plurality of activation parameters, wherein the plurality of activation parameters includes activating the supplemental drying mechanism in accordance with a schedule of on cycles and off cycles and activating the supplemental drying mechanism when a drum temperature is less than a drum temperature threshold;
            selecting one of a plurality of termination parameters, wherein the plurality of termination parameters includes terminating the selected drying operation after a time interval and terminating the selected drying operation when a dryness level measurement of drum contents reaches a dryness measurement threshold;
            operating the drum and the fan;
            activating the supplemental drying mechanism in accordance with the selected activation parameter; and
            terminating the selected drying operation in accordance with the selected termination parameter.

19. The laundry drying machine of claim 18, wherein:
    selecting one of a plurality of activation parameters comprises selecting the drum temperature threshold from a plurality of drum temperature thresholds; and
    selecting one of a plurality of termination parameters comprises selecting the dryness measurement threshold from a plurality of dryness measurement thresholds.

20. The laundry drying machine of claim 18, wherein the step of selecting one of a plurality of activation parameters comprises selecting the drum temperature threshold from a plurality of drum temperature thresholds and modifying the selected drum temperature threshold value upon receiving a temperature modification selection at the user interface.

21. The laundry drying machine of claim 18, wherein the step of selecting the one of a plurality of termination parameters comprises selecting the dryness measurement threshold from a plurality of dryness measurement thresholds and modifying the selected dryness measurement threshold value upon receiving a dryness modification selection at the user interface.

22. The laundry drying machine of claim 18, wherein the step of terminating the selected drying operation in accordance with the selected termination parameter comprises:
    initiating a supplemental drying process; and
    terminating the selected drying operation after initiating the supplemental drying process.

23. The laundry drying machine of claim 18, wherein the instructions, when executed by the processor, further cause the electronic control unit to:
    perform a timed cooldown operation without temperature feedback.

* * * * *